(12) United States Patent
Sakaki et al.

(10) Patent No.: US 6,374,327 B2
(45) Date of Patent: *Apr. 16, 2002

(54) METHOD OF DATA MIGRATION

(75) Inventors: Hidetoshi Sakaki; Akira Kurano; Katsunori Nakamura, all of Odawara; Takehiro Ishikawa, Itabashi-ku; Toshiaki Hatanaka, Odawara; Hiroshi Nishijima, Mishima, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/782,080

(22) Filed: Feb. 14, 2001

Related U.S. Application Data

(63) Continuation of application No. 08/988,979, filed on Dec. 11, 1997, now Pat. No. 6,230,239.

(30) Foreign Application Priority Data

Dec. 11, 1996 (JP) ............................................. 8-330883

(51) Int. Cl.⁷ ................................................ G06F 13/16
(52) U.S. Cl. ....................................... 711/112; 711/161
(58) Field of Search ................................. 711/112, 162

(56) References Cited

U.S. PATENT DOCUMENTS

| 5,680,640 A | 10/1997 | Ofek et al. ............... 711/162 |
| 5,835,954 A | 11/1998 | Duyanovich et al. ....... 711/162 |
| 5,896,548 A | 4/1999 | Ofek ......................... 710/20 |

FOREIGN PATENT DOCUMENTS

| JP | 6250795 | 9/1994 |
| JP | 7191811 | 7/1995 |

OTHER PUBLICATIONS

Symmetrix ICDA Family Product Announcement, Symmetrix Data Migration Services (SDMS), Nov. 6, 1995.

*Primary Examiner*—Reginald G. Bragdon
(74) *Attorney, Agent, or Firm*—Antonelli, Terry, Stout & Kraus, LLP

(57) ABSTRACT

A method, apparatus and computer program for controlling data migration in an information processing system which includes a central processing unit (CPU), a new storage system connected to the CPU and an old storage system connected to the new storage system. In the information processing system data migration is conducted to transfer data from the old storage system to the new storage system. The invention operates by permitting access by the CPU to the storage systems during data migration. When an access by the CPU is generated the invention determines whether the access is to a region where data migration has been completed or to a region where data migration has not been completed. If the access is to a region where data migration has been completed, then processing of the access is handled by the new storage system. If the access is to a region where data migration has not been completed, then processing of the access is handled by the old storage system causing data related to the access to be transferred from the old storage system to the new storage system. The speed of data migration can be adjusted based upon the utilization of the resources of the information processing system and information of the priority of access to the new storage system by the CPU.

2 Claims, 4 Drawing Sheets

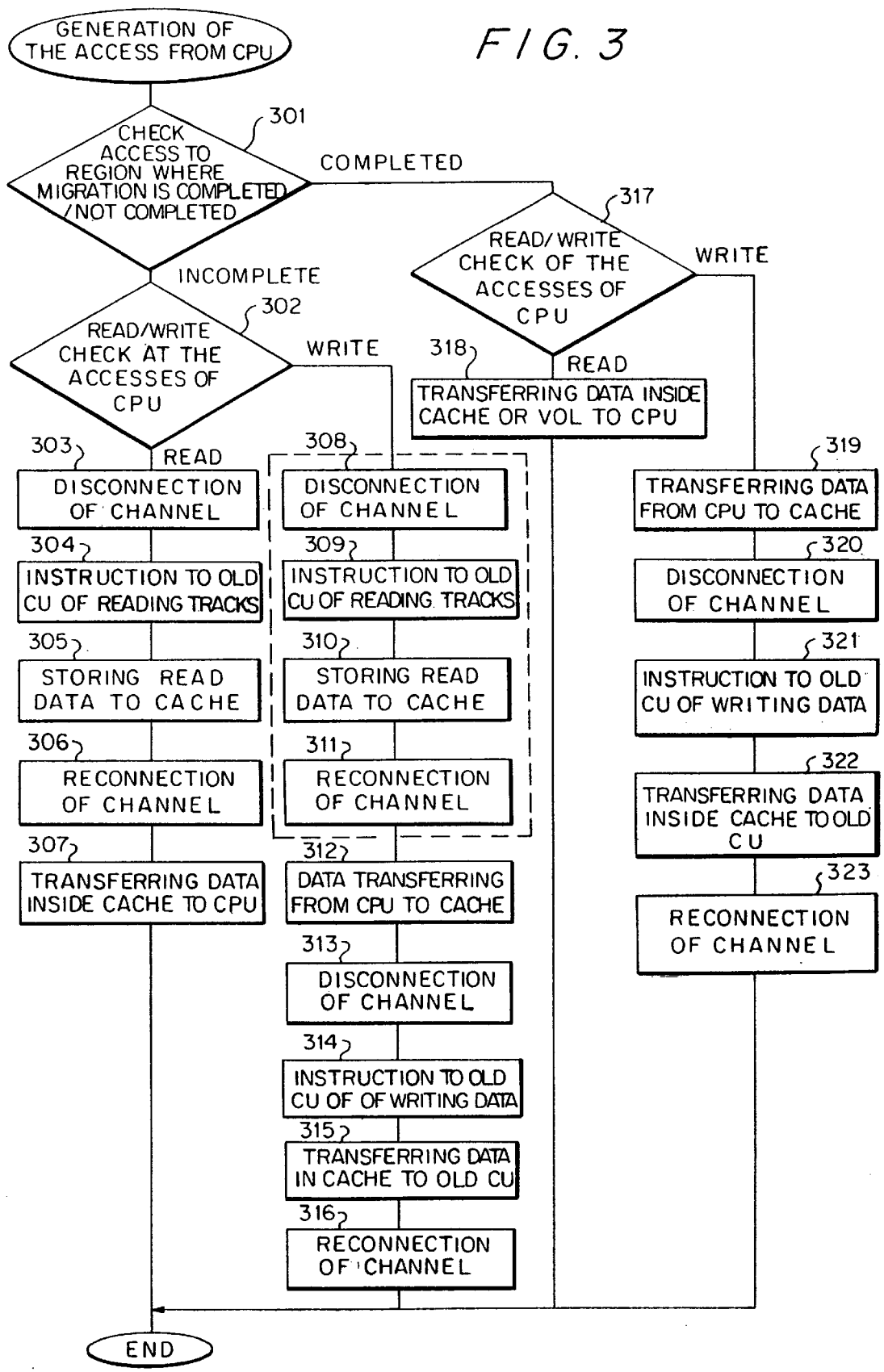

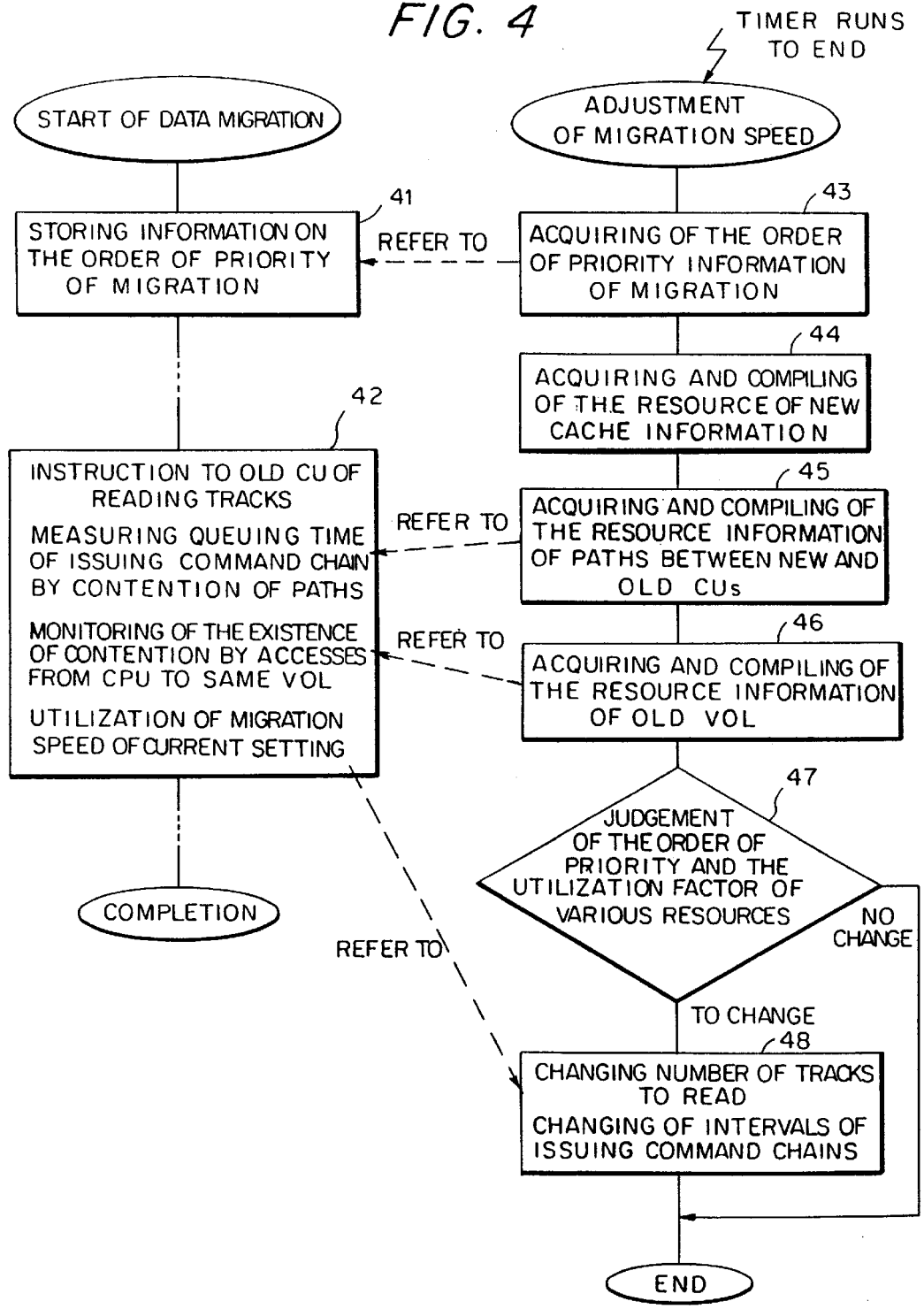

METHOD OF DATA MIGRATION

This is a continuation of application Ser. No. 08/988,979, filed Dec. 11, 1997, now U.S. Pat. No. 6,230,239.

BACKGROUND OF THE INVENTION

The present invention relates to the process of data migration between storage systems. More particularly, the present invention relates to a method, apparatus and computer program for use in a system that performs data migration between storage systems for causing the system to accept access to the storage systems even though data migration between the storage systems has not been completed.

Hereinafter the term "old" when used with other terms, for example, "old volume" indicates the resources of the system where the data originates during data migration. Further, hereinafter the term "new" when used with other terms, for example, "new volume" indicates the resources of the system where the data is destined during data migration. Data migration is the transferring of data from the old volume to the new volume. A volume is a storage system implemented by disk, memory circuits or the like.

During the process of data migration between the old volume and the new volume, where the CPU of the overall system reads data from the old volume and writes the data to the new volume, access by the CPU to volumes in response to a request generated by the execution of a job of a customer is prevented. Accesses to the volumes can sometimes be stopped for long time during data migration. Thus, the effectiveness of the overall system is reduced.

To address this disadvantage, IBM corporation developed a method of data migration which permits access from the CPU (disclosed by IBM 3990 model 6 Enhancements) using an extended remote copy function (hereafter XRC) or a peer to peer remote copy function (hereafter PPRC). This disadvantage was also addressed by EMC Corporation which developed a method of data migration that permits access from the CPU in Symmetrix Data Migration Service (SDMS) as described in the SYMMETRIX ICDA Family PRODUCT ANNOUNCEMENT SUMMARY, Nov. 6th, 1995.

The system with XRC is provided with a function of storing data, to be written to the old volume (disk subsystem), from the CPU into a disk controller in the old disk subsystem. The disk controller then stores the data into the old disk subsystem. In order to accomplish data migration the CPU has the function of reading the stored data from the old disk subsystem via the disk controller. Thereafter, the CPU writes the data to the new disk subsystem thereby completing data migration.

After data migration has been completed, a request for access to the old disk subsystem generated by execution of a customer job is prevented until the path to the old disk subsystem is switched to that of the new disk subsystem. Access is then permitted to the new disk subsystem.

The above-described system with XRC requires that the function of the XRC be provided in the old disk subsystem and the CPU. Intervention of the CPU is not required to perform the access. However, as with general data migration, the new setting for the new disk subsystem is required for the CPU.

In the system with PPRC, the old disk subsystem and the new disk subsystem are connected to each other to permit communication between them. By writing data to be written by the CPU to the new disk subsystem through the connection, data migration during access from the CPU is enabled. As with the XRC, access generated by execution of the job of a customer after the completion of data migration is prevented until the path to the disk subsystems has been switched. In the system with PPRC, intervention of the CPU to perform the access, as with the system with the XRC, is not required. However, the old and the new disk subsystems must be provided with the function of the PPRC.

In the system with SDMS in order to conduct data migration, first the access from the CPU to the old disk subsystem is stopped. Then the connection of the access path from the CPU to the old disk subsystem is changed to the connection of the access path from the CPU to the new disk subsystem through a new access path between the old disk subsystem and the new disk subsystem. By reading data from the old disk subsystem and writing it to the new disk subsystem through the new access path, data migration is started. After the start of data migration, the access from the CPU is restarted. If the access from the CPU is to a region where data migration has been completed, the new disk subsystem processes the data directly. If the access from the CPU is to a region where data migration has not been completed, after the data of the relevant tracks in the old disk subsystem is read and written into the new disk subsystem, the new disk subsystem processes the data with normal processing. Thus, access from the CPU during data migration is enabled.

The important feature of the function of the SDMS is that the old disk subsystem is not required to have the function of data migration. The priority of the order of volumes that are to be transferred faster can be defined at the start of data migration. However, after completion of data migration dual operation of the new disk subsystem and an alternate disk subsystem can not be conducted unless repeated data migration processes are performed using a Symmetrix Remote Data Facility.

SUMMARY OF THE INVENTION

An object of the present invention is to provide a method, apparatus and computer program that allows for the safe writing of data by the CPU to the old and new volumes during data migration.

Another object of the present invention is to provide a method, apparatus and computer program for performing a data migration process while enabling dual operation of old and new volumes immediately after completion of data migration and enabling relatively immediate switching of the new volume to the old volume when the new volume failed during data migration.

Yet another object of the present invention is to provide a method, apparatus and computer program having a function of automatically adjusting data migration speed during data migration depending on the state of the load to the new volume so as to give priority to accesses to the new volume by the CPU.

Still yet another object of the present invention is to provide a method, apparatus and computer program for performing data migration in a manner that improves the performance of data migration and access to the volumes by the CPU.

The present invention provides a method, apparatus and computer program for performing data migration in a general purpose computer system. The general purpose computer (information processing) system includes a central processing unit (CPU), a new disk controller (CU), a new disk volume (VOL), an old CU and an old VOL. The new CU and new VOL are the destination of data migration and the old CU and the old VOL are the origin of data migration. The new CU is provided with a data migration control part that controls data migration of data between the old and new VOLs and a cache that stores data for later storage to the new VOL. A CU and a VOL can be implemented by a disk subsystem or a server.

The present invention provides a plurality of connections between the above-described elements. Particularly, the present invention provides a connection between the CPU and the new CU and a connection between the new CU and the old CU. There are also connections between the new CU and the new VOL and between the old CU and the old VOL.

The connections between the CPU and the new CU and between the new CU and the old CU are configured to permit data migration from the old VOL to the new VOL. When data migration is started, access by the CPU to the old and new VOLs is temporarily stopped. After start of data migration, access from the CPU is permitted.

In the present invention, upon issue of an access by the CPU the data migration control part in the new CU judges if the access is to a region where data migration has been completed or to a region where data migration has not been completed. When the access by the CPU is to a region where data migration has been completed, the data exists in the new CU and the new CU responds to the access. When the access by the CPU is to a region where data migration has not been completed, the data does not exist in the new CU. Thus, the data migration control part responds to the access by accessing the old CU through the connection between the old CU and the new CU to retrieve the data to the cache 18 in the new CU. After the CPU operates on the data, the data is then written to both the new CU and the old CU.

As per the above, in the present invention when the CPU accesses a region where data migration has not been completed, data from tracks read from the old volume are stored to the new volume and the data once operated on is stored to both the old volume and the new volume. Further, when the data is to be written to the new volume, the data is also written to the old volume. Thus, the new and the old volumes contain the same data at the regions where data migration has been completed. Therefore, immediate switching to dual operation after the completion of data migration is enabled. Also switching to the old volume is possible when a failure occurs in the new volume during data migration since the most recent update of data is reflected in the old volume. The above-described writing by the CPU to the new and old VOLs can be safely conducted during data migration.

By reflecting data of tracks read from the old disk subsystem during access by the CPU to a region where data migration has not been completed to the new volume, the data migration process can skip the tracks. Skipping tracks in the which data migration is not necessary improves the efficiency of the data migration process. Further, by leaving data of a track on the cache of the new CU allows for repeated access to the data by the CPU. Allowing for such repeated access to data in the cache improves the efficiency of access by the CPU during data migration.

The present invention adjusts data migration speed based on various information of the system that have been acquired and analyzed. Such information includes information of the utilization of the cache in the new CU, information of the utilization of the connection between the new CU and the old CU, information of the utilization of the old VOL and information of the utilization of data migration speed at the current speed. The present invention provides a function where the data migration speed can be adjusted in a manner to give priority to access of the old VOL by the CPU.

BRIEF DESCRIPTION OF THE DRAWINGS

The present invention will be more apparent from the following detailed description, when taken in conjunction with the accompanying drawings, in which:

FIG. 3 is a flowchart of the operations performed by the present invention when access by the CPU occurs during data migration; and FIG. 4 is a flowchart of the operations performed by the present invention on the migrating side to adjust automatically data migration speed during data migration.

DESCRIPTION OF THE PREFERRED EMBODIMENT

FIGS. 1–4 will be used to explain the features of the present invention for performing data migration in a general purpose computer system.

Figure 1:
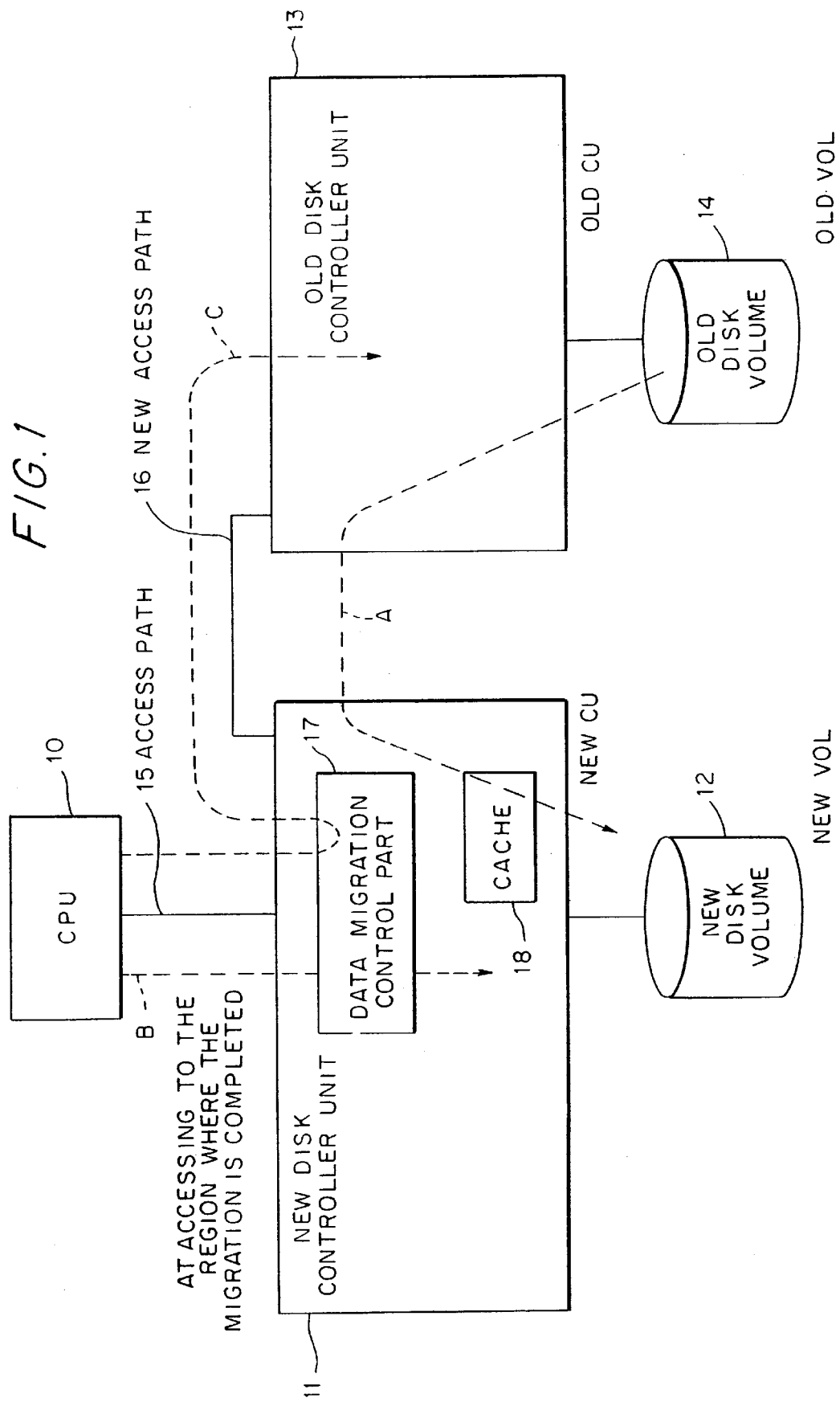
FIG. 1 illustrates the configuration of the presented invention for performing data migration in a general purpose computer system.

FIG. 1 illustrates the configuration of the present invention for performing data migration in a general purpose computer (information processing) system that is the preferred embodiment of the present invention. The information processing system of the preferred embodiment of the present invention includes CPU 10 that is the central processing unit, a new disk controller unit (hereafter new CU) 11 and a new disk volume (hereafter new VOL) 12 that are the destination of data migration, and an old CU 13 and old VOL 14 that are the origin of data migration. The new CU 11 is provided with a data migration control part 17 that controls data migration of the data and a cache 18 that stores data. Here the new disk subsystem includes the new CU 11 and the new VOL 12, and the old disk subsystem includes the old CU 13 and the old VOL 14. In the present invention a CU and its VOL can be implemented by a server.

In the configuration connections are provided for performing the data migration process of the preferred embodiment of the present invention. The connections include a connection 15 between the CPU 10 and the new CU 11, and a connection 16 between the new CU 11 and the old CU 13. There is also a connection between the new CU 11 and the new VOL 12 and a connection between the old CU 13 and the old VOL 14.

A flowchart of the operation of the preferred embodiment of the present invention is explained below. The connections 15 and 16 are configured to permit data migration from the old VOL 14 to the new VOL 12. When data migration has been started, access by the CPU 10 to the old and new VOLs 14 and 12 is temporarily stopped. Data migration from the old VOL 14 of the old CU 13 to the new VOL 12 of the new CU 11 is represented by the dashed-line arrow A. After the start of data migration, access from the CPU 10 is restarted. Therefore, accesses to the new CU 11 during data migration by the CPU 10 can be performed.

Upon receipt of an access by the CPU 10 the data migration control part 17 inside the new CU 11 judges if the access is to a region where data migration has not been completed or to a region where data migration has been completed. When the access is to a region where data migration has been completed, the data exists in the new CU 11 and the new CU 11 performs the service as represented by the dashed-line arrow B. On the contrary, when the access is to a region where data migration has not been completed, the data does not exist in the new CU 11. Therefore, data migration control part 17 performs the service by accessing the old CU 13 as represented by the dashed-line arrow C through connection 16. The relevant data is retrieved from the old CU 13 and stored in the cache 18 of the new CU 11. Once the CPU 10 has operated on the data, the data is stored to both the new VOL 12 and the old VOL 14. With these operations, access by the CPU 10 during data migration is enabled.

The interface between the new CU 11 and the old CU 13 through data migration control part 17 is controlled using the communication protocol of the CPU 10, thereby not requiring any specific function for operating the old CU 13.

Figure 2:
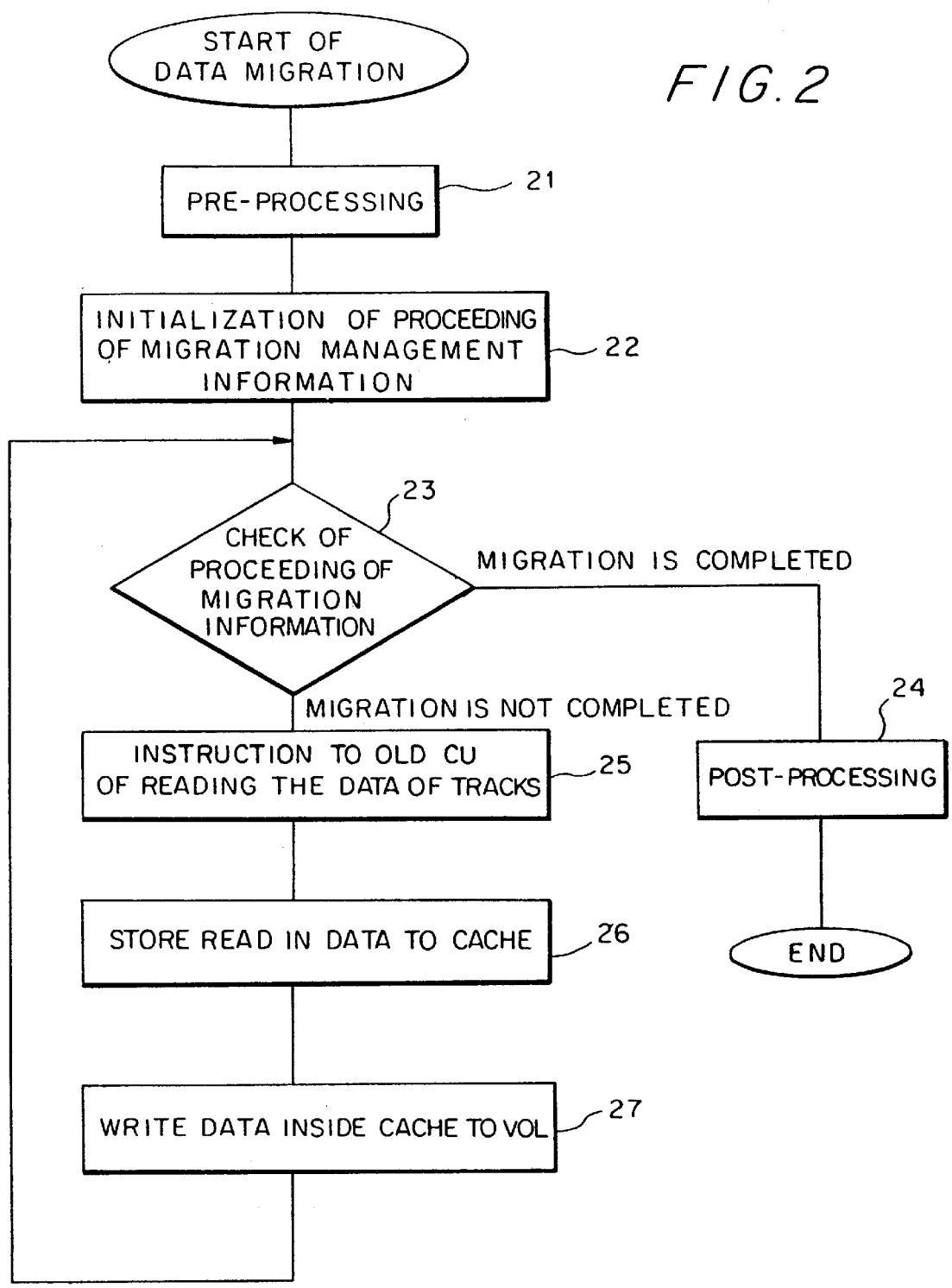
FIG. 2 is a flowchart of the operations of data migration performed by the data migration control part of the present invention.

FIG. 2 is a flow chart of the operations performed by the data migration control part 17 when data migration is conducted. Each of the steps of the flowchart in FIG. 2 can be implemented by the code of a computer program. After the instruction of starting data migration a pre-processing operation (Step 21) is performed where the execution condition of data migration is checked, the state of data migration is changed and other such pre-processing operations are performed. Then migration management information used to manage data migration is initialized (Step 22). In order to manage the data migration process the present invention may use either a copy pointer which indicates only the present position of data migration or a bit map that illustrates with respect to all tracks or cylinders whether data migration has been completed or not completed as the migration management information.

After the above, the migration management information is checked (Step 23). If data migration of all the data on the old VOL 14 has been completed then a post-processing operation is performed (Step 24). The post-processing operation includes operations such as changing the state of data migration. Thereafter, data migration is ended. If data migration of all of the data on the old VOL 14 has not been completed then a command chain for reading in multiple tracks next to the track (if it is a first copy, tracks at top region) where data migration has been completed is issued (step 25) to the old CU 13 based upon the migration management information.

At this time, the data migration control part 17 performs the emulation of issuing the command chain to the old CU 13 the same as if the command chain had been issued from the CPU 10 to the CU (11) as a Define Extent/Locate Record/Read Track) command chain. If the old CU 13 has a function equivalent to that of the new CU 11, high speed transferring can be done with the dedicated command chain. The data read in from the old CU 13 is stored to the cache 18 (step 26) inside the new CU 11 temporarily and the data in the cache 18 is written to the new VOL 12 (step 27).

The reading process from the old CU 13 is performed by sequential access. Since the old CU 13 is provided with a cache 18 same as the new CU 11 and a prefetch function, the data transferring from the cache 18 of the old CU 13 to the cache 18 of the new CU 11 can be conducted at high speed. Thus, the data stored in the cache 18 of the old CU 13 is in effect stored in the cache 18 of the new cu 11 (stage) and then destroyed when written to the new VOL 12 (destage). This destaging is for the continuous tracks so that when the function of destaging a bundle of multiple continuous tracks is used, the efficiency of the destaging is improved and high speed data migration is enabled. The path for the reading in of the data from the old CU 13 to the cache 18 of the new CU 11 and the path for destaging the data from the cache 18 to the new VOL 12 are different so that parallel execution of processings can be performed. Thus, the performance of the processing of data migration is improved. After data is written to the new VOL 12 processing is returned to Step 23 where the migration management information is checked.

FIG. 3 is a flowchart of operations performed when CPU access is generated during data migration. Each of the steps of the flowchart in FIG. 3 may be implemented by the code of a computer program.

First, when access from the CPU 10 is generated a judgement is performed to determine whether the access is to a region where data migration has been completed or to a region where data migration has not been completed (Step 301). This judgement as to whether access is to a region where data migration has been completed or a region where data migration has not been completed is performed based on the above-described migration management information.

If the access is to a region where data migration has not been completed, the access from the CPU 10 is then judged to determine whether it is a READ or a WRITE access (Step 302). If the access is judged to be a READ access it is necessary to read in the data from the old CU 13 since the data does not exist in the new CU 11.

For this purpose, the connection 15 between the CPU 10 and the new CU 11 is disconnected (step 303) temporarily and the data migration control part 17 issues a command chain to the old CU 13 for reading the relevant tracks (step 304) through connection 16.

The data migration control part 17 emulates the CPU 10 in that it issues a command chain similar to the command chain of Define Extent/Locate Record/Read track that is issued by the CPU 10. The tracks which have been read from the old CU 13 are stored to the cache 18 in the new CU 11 (step 305) and the channel between the CPU 10 and the new CU 11 is reconnected (step 306). Then as with general cache READ hit processing, the data in the cache 18 is processed by transferring it to the CPU 10 (Step 307).

If the access is to a region where data migration has not been completed and the access is judged to be a WRITE access (Step 302), processing proceeds to Step 308. In this case, as with the READ access, the connection 15 between the CPU 10 and the new CU 11 is temporarily disconnected (Step 308), the old CU 13 is instructed to read in the relevant tracks (Step 309) through connection 16, the tracks which have been read in from the old CU 13 are stored to the cache 18 in the new CU 11 (Step 310) and the connection 15 between the CPU 10 and the new CU 11 is reconnected (Step 311). Then the data is transferred from the CPU 10 to the cache 18 in the new CU 11 (Step 312). Steps 308 through 311 can be replaced by an operation of writing data directly to the old CU 13 through connection 16 without performing the operations of reading data from the old CU 13 as per steps 308 to 311.

After the above connection 15 between the CPU 10 and the new CU 11 is disconnected (Step 313) temporarily and the data migration control part 17 issues a command chain for writing the data to the old CU 13 (Step 314) through connection 16. The data migration control part 17 emulates the CPU 10 by issuing a command chain similar to a write command chain issued by the CPU 10. The data to be written is transferred from the cache 18 of the new CU 11 to the old CU 13 through connection 16 (Step 315) and then the connection 15 between the CPU 10 and the new CU 11 is reconnected (step 316).

In steps 305 and 310, by storing data from the CPU 10 to the cache 18 in the new CU 11 and writing the data stored in the cache 18 in the new CU 11 to the old VOL 14 and the new VOL 12 the present invention allows for data migration with respect to the data to be skipped. This is possible since the data has been moved from the old VOL 14 to the new VOL 12 and updated before writing therein. Further, the present invention allows for repeated access to data in the cache 18 of the new CU 11 by the CPU 10. When data migration is conducted a judgement must be performed to determine whether a region is a region to be skipped or not. This judgement can be performed by checking the migration management information when the migration management information is in the form of a bit map or a copy point. In order to improve efficiency a region in which data migration is to be skipped should have a considerable amount of range such as, for example, two cylinders.

When an access by the CPU 10 is judged to be an access to a region where data migration has been completed at step 301 a judgement is performed to determine whether the access is a READ access or a WRITE access (Step 317).

If the access is judged to be an access to a region where data migration has been completed and the access is a READ access, as the data exists on the new CU 11, the data in the cache 18 of the new CU 11 or in the new VOL 12 is transferred to the CPU 10 as with general READ processing (Step 318) and the processing is completed.

If the access is judged to be an access to a region where data migration has been completed and the access is a WRITE access, as with a general WRITE processing the data is transferred from the CPU 10 to the cache 18 of the new CU 11 (Step 319). Similar to the case where the WRITE access is to a region where data migration has not been completed, the connection 15 between CPU 10 and new CU 11 is temporarily disconnected (Step 320), and a command chain for writing the data to the old CU 13 through connection 16 is issued by the data migration control part 17 (Step 321). Thereafter the data in the cache 18 of the new CU 11 is transferred to the old CU 13 (Step 322) and the connection between the CPU 10 and the new CU 11 is reconnected (Step 323).

According to the above, when the WRITE access is to the region where data migration has been completed or the WRITE access is to the region where data migration has not been completed, a WRITE process is performed of writing data from cache 18 of the new CU 11 to the old CU 13 (Steps 313 to 316 and Steps 320 to 323). Thus, the old VOL 14 is always stored with the latest data. Therefore, after data migration has been completed, dual operation of the new VOL 12 and the old VOL 14 can be performed immediately. Further, relatively immediate restart of operation on the side of the old CU 13 can be performed after the failure of the new VOL 12 during data migration. Still further, due to the operations described above a WRITE access can be safely conducted during data migration.

FIG. 4 is a flowchart which illustrates the operations performed for the automatic adjustment of migration speed during data migration. Each of the steps of the flowchart in FIG. 4 may be implemented by the code of a computer program.

In FIG. 4 when conducting data migration, a processing to store information indicating the specified order of priority of data migration of the plural VOLs (Step 41) is required. When processing an instruction for the old CU 13 to read in tracks of data, the queuing time of the command chains caused by contentions for the connection 16 between the new CU 11 and the old CU 13, the existence of the contentions for the same VOL by accesses from the CPU and the utilization of migration speed according to the current settings are measured (Step 42).

The processing of migration speed adjustment is, as shown in FIG. 4, performed at a set timing according to a timer. Thus, information of data migration sequence of priority stored during the data migration process is acquired (Step 43).

Then cache resource information indicating the utilization of the cache 18 of the new CU 11 is acquired and compiled (Step 44). The utilization factor of the cache is determined based on all processings in the new CU 11 utilizing the cache 18 including the processings related to data migration. The utilization factor is calculated by counting the number of segments of the cache 18 that are not used.

Then path resource information indicating utilization of the path between the new and the old CUs 11 and 13 is acquired and complied (Step 45). The average queuing time of the command chains for data migration caused by the generation of contentions for the path between new and old CU's 11 and 13, measured during data migration, is used as the path resource information. For the queuing time, the rate of the change of the average value is calculated using past information.

Then old VOL resource information indicating utilization of the old VOL 14 is acquired and complied (Step 46). The sum of the existence of contentions of command chains for data migration by accesses from the CPU 10 to the same VOL 12, 14, measured during data migration, is used as the old VOL resource information. For the sum of the existence of contentions, the rate of the change of the existence of contentions is calculated using past information.

Based on the order of the priority of sequence of data migration and the various resource information, a judgement is performed to determine whether migration speed should be changed (Step 47). The migration speed is changed by manipulating at least one of the following two items. If the change is judged to be unnecessary, the processing is finished. If the change is judged to be necessary, the processing proceeds to the Step 48. In the Step 48, there are two items to be adjusted. One of the two items is the number of tracks to be read in at one command chain for data migration. The other of the two items is the issuing interval of the command chains for data migration. When the various resource information indicates the tendency of an increase of access by the CPU, the number of the tracks to be read in is reduced or the issuing interval of the command chains issued by the CPU that have been given priority is lengthened.

The present invention allows for the setting of a VOL with higher priority such that migration speed is not reduced even when access by the CPU 10 is increasing.

By use of the present invention, writing of data to the old and new VOLs can be safely conducted during data migration. Also access by the CPU can be conducted with certainty to the VOLs even though data migration has not been completed.

Further, by use of the present invention, the same data is stored on the new and the old volumes in the region where data migration has been completed. Thus, immediate switching to dual operation using both old and new volumes is enabled after data migration has been completed. In addition, faster switching to the old volume when failure has occurred in the new volume during the migration is enabled.

Still further, by use of the present invention the migration speed can be automatically adjusted based on the priority order given the volumes. Thus, faster migration of the volume with higher priority is enabled while giving priority to accesses from the CPU during data migration.

Still further yet, by use of the present invention, the data migration process can be skipped on tracks previously accessed by the CPU where data migration had not been completed since data migration is performed at the time of the previous access. Thus, when the tracks are accessed repeatedly, these accesses are processed with the cache of the new CU, thereby improving access performance of the CPU during data migration.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of controlling data migration in an information processing system which includes a CPU, a new storage system coupled to said CPU and an old storage system coupled to said new storage system, wherein data migration is conducted to transfer data from said old storage system to said new storage system, said method comprising:

permitting access to said storage systems by said CPU during data migration;

determining whether said access is to a region where data migration has been completed based on a copy pointer;

processing said access to said new storage system when said access is to a region where data migration has been completed; and processing said access to said old storage system and transferring data related to said access from said old storage system to said new storage system when said access is to a region where data migration has not been completed, wherein said processing said access to said new storage system comprises:

checking whether said access is a READ access or a WRITE access, when said access is a READ access, transferring data related to said access from said new storage system to said CPU, and when said access is a WRITE access, transferring data related to said access from said CPU to both said new storage system and said old storage system.

2. A method according to claim 1, wherein said copy pointer indicates the position of data migration.

* * * * *